June 22, 1954

M. BLAINE 2,681,514

INFLATABLE MAP

Filed Sept. 16, 1952

INVENTOR.
Martin Blaine
BY Darby & Darby
ATTORNEYS.

June 22, 1954  M. BLAINE  2,681,514
INFLATABLE MAP
Filed Sept. 16, 1952  2 Sheets-Sheet 2
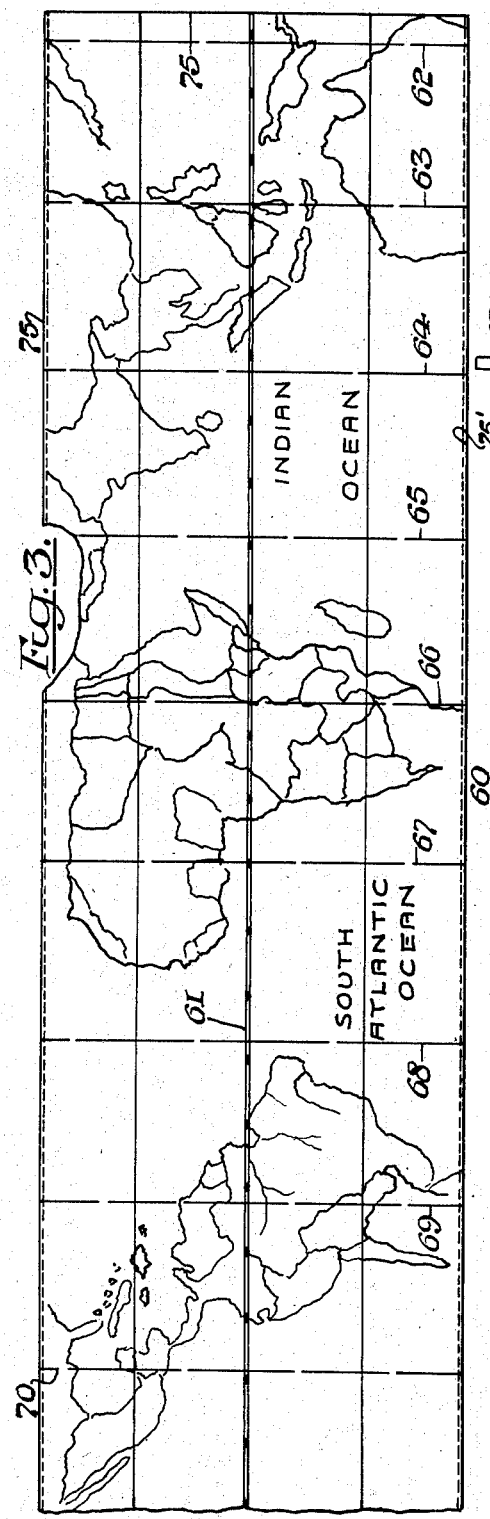
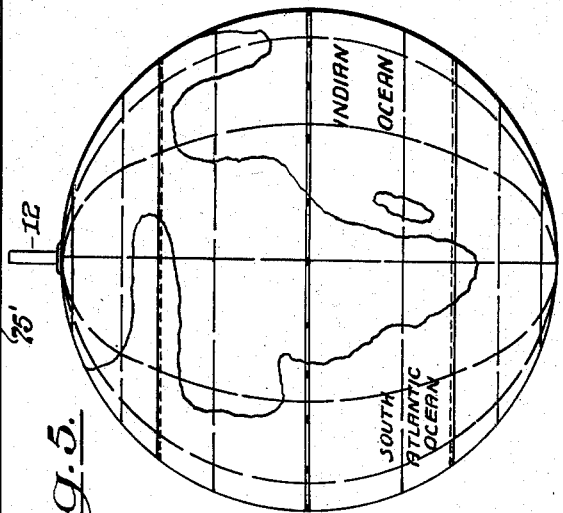
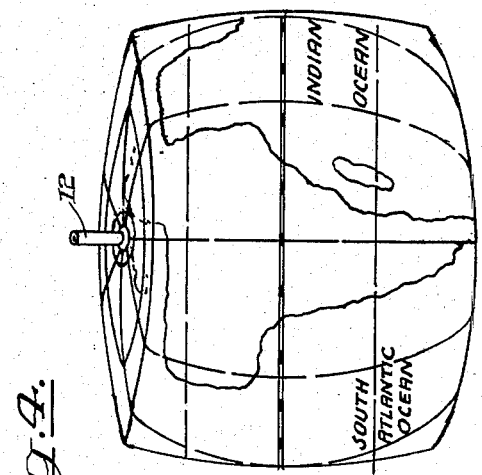
INVENTOR.
Martin Blaine
BY Darby + Darby
ATTORNEYS.

Patented June 22, 1954

2,681,514

UNITED STATES PATENT OFFICE 2,681,514

INFLATABLE MAP

Martin Blaine, New York, N. Y.

Application September 16, 1952, Serial No. 309,922

7 Claims. (Cl. 35—46)

| 1 | 2 |

This invention relates to an inflatable globe map of the world and to a method of making it.

It is often desirable in the teaching of geography to have a spherical map of the world in order to overcome the intellectual obstacle that many youthful minds encounter in visualizing a spherical world when it is presented in flattened projection maps. In the presentation of geographical information in flat maps a variety of techniques have been developed for attempting to present reasonably accurate pictures without greatly distorting the outlines of the areas shown. The unfortuate fact of geometry is, however, that where the earth's surface is essentially that of a sphere, no flat map can present a reasonably accurate outline of any but limited areas of that spherical surface. In answer to the needs for projections of the earth's surface many have been worked out and among the most popular are polar projections and varieties of the Mercator projections.

The cost of using spherical maps in the numbers in which they would be required in schools is generally prohibitive in any but private school systems. That is, globes for instructional purposes cannot be offered on any basis more liberal than one per classroom.

It is accordingly a fundamental object of my invention to provide a spherical map of the world which can be used in large numbers for instructional purposes, the map being characterized by presenting a reasonably accurate outline of the various geographical areas on the earth's surface and having the further virtue of being sufficiently inexpensive to be available on an individual basis to pupils.

It is another object of the invention to provide an inflatable globe map of the world which can be useful for the study of geographical areas on more than one scale by inflating it to greater or lesser degrees.

Other objects and advantages of the invention will in part be obvious and in part appear hereinafter.

The invention accordingly is embodied in an inflatable globe map of the world so assembled from three simple pieces that when inflated to an appropriate extent it is converted from a closed straight sided cylindrical form to a substantially accurate sphere, the invention residing in the proportionation of parts, the preparation of appropriate projections for incorporation on those parts and in the assembly of those several parts to form a complete globe map of the world.

The invention is better understood by reference to the drawings, wherein,

Figure 3 is a plan view representing the developed mid section of the device, wherein the geographical information is presented essentially in Mercator projection;

Figure 4 is a view of the assembled device partially inflated to show the fundamental straight sided cylindrical basic form; and Figure 5 is a view of a completed device showing the three parts appropriately assembled to form a unit and inflated to a proper extent to render it spherical.

Basically the map is formed by assembling the three elements into a straight sided cylindrical piece. The number of elements may be greater, but the preferred minimum is three, the pieces comprising a north polar section, a south polar section to define the ends of the map and a mercator mid section for the map. It is, of course, understood that the polar projections of the map can be centered at any point on the globe. By developing in polar projection an appropriate area, and then a second polar projection of appropriate area around a diametrically opposite point, and developing the remainder of the surface is a Mercator projection, there can be assembled a globe having the same features and characteristics as the one comprising the instant invention. The particular projections as listed in Figures 1, 2 and 3 were selected for orientation and proportionation as being the most convenient for assembly with respect to the geometric symmetry of the finally completed device, as well as convenience in developing the geographical information, for the mid section corresponds rather closely to the conventional Mercator projection popularly used.

Figure 1:
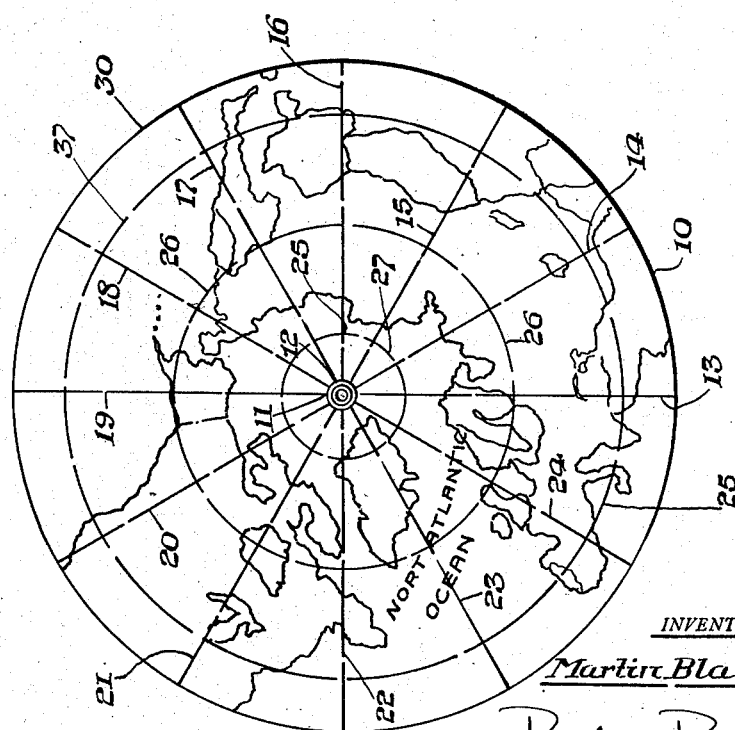
Figure 1 is a plan view of part of the globe map of the world representing a north polar projection.

In Figure 1, 10 represents the entire section and 11 the central point of the section at which a tube or inflating valve 12 of any conventional structure used for inflatable balls may be used. The geographical information is laid out on the section in polar form and the radiating lines 13–24 represent an average number of indications of longitude on the map. Concentric circles 25, 26, 27 represent indications of latitude in the area being presented. The selection and placing of lines of longitude and latitude is chosen so that a reasonable amount of information is presented and the lines further have the utility of assisting in the orientation of the pieces in the final assembly.

The full area presented in the section shown in Figure 1 is larger than that which is needed on the map per se by a very small amount represented by the narrow area 30 around the circumference of the unit. This section generally is about ¼ inch and may be described as just sufficient to permit the formation of a small seam with the adjacent piece when it is assembled.

Figure 2:
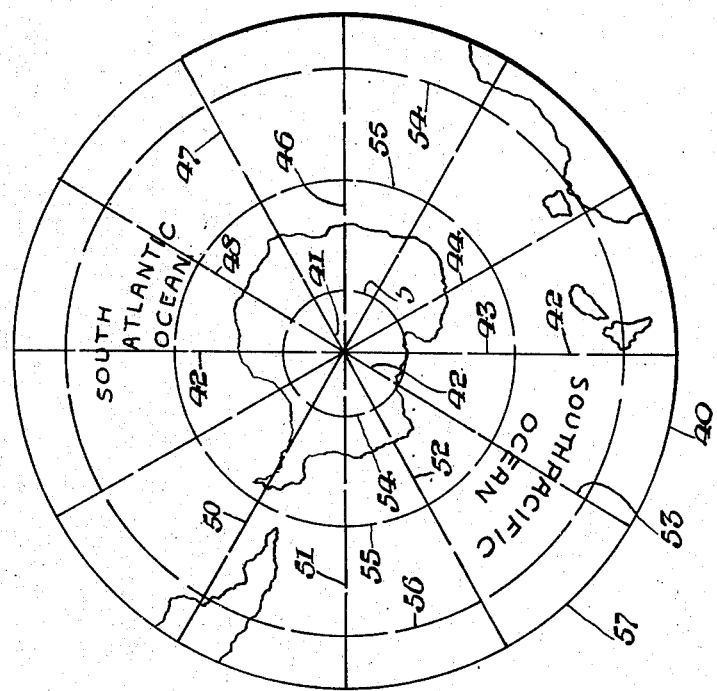
Figure 2 is a plan view of the opposite part of the device representing a south polar projection.

Similar considerations govern the proportioning and layout of Figure 2 wherein 40 represents the piece itself, 41 the central point, in this case the South Pole, and 42–53 a number of lines of longitude corresponding to those used in preparing the north polar projection. That is, for proper registry of parts and accurate presentation of information not only the same number of lines of longitude should appear on each piece, but they should be the same lines of longitude. Also, in the preparation of the south polar projection, the extra area 57 around the outer periphery of the base is provided for assembly of the elements. As in the case of the north polar projection, concentric circles 54, 55 and 56 are indications of lines of latitude.

In Figure 3 there is shown a Mercator projection of the mid section of the world map. Therein the familiar outlines of the several continents coming within that mid section of the world are shown and 60 identifies the general area presented, 61 the equator and 62–70 the several lines of longitude. This section has been identified as a Mercator projection, because it resembles that particular projection of the world more nearly than any other, even though it need not be an accurate Mercator projection in the sense that it shows the minor distortion brought about by straightening the lines of longitude in developing the projection. For purposes of the application, however, it is best identified as a Mercator projection. Around the periphery of the element 60 there is allowed the slight narrow section 75, which is just sufficient to permit binding with the other portions of the world map. In laying out this section, care should be taken to develop on it the areas of the world so oriented with respect to the lines of longitude shown that when assembled the registry of the lines of longitude is accurate and the outlines of the continents themselves are accurate.

For transferring the information to the several pieces and for the material to be used, I have found silk screening on polyvinyl chloride film a very desirable technique. Accordingly, where the presentation is to be in two, three or four colors, it is preferable that the base film itself be of a blue shade so that the areas representing the oceans may be automatically presented in their conventional color when the information is printed on them. In order that the lines of longitude and the text information on the map be presented properly it is best that the color areas used to designate the separate political entities throughout the map be done first. That is, the silk screening or rotary press, if such is to be used, are designed and placed so that the colored areas representing the world are applied first. For the coloring material any of the silk screening inks which are pigmented in bright colors may be used. It is preferable that an ink having a film-forming base of polyvinyl chloride in solution be used, inasmuch as the printing is preferably on a polyvinyl chloride base. This is simply matching the compatability of the ink with the base on which it is to be applied. The last operation in the printing after the several colors for the political entities are applied is to overprint the entire surface in black which inserts the proper legends and the lines of longitude and other geographical indications. Following the preparation of the several pieces carrying such information, the assembly operation is carried out. That is the end edges of the Mercator section are aligned and sealed together to form what is essentially an open tube. The correct portion of the edge of the polar projection of Fig. 1 is then aligned with the appropriate portion of the edge 75 of the tube formed from the projection shown in Fig. 3 and the end sealed on. Similarly the polar projection 40 is sealed along its edge 57 to the other edge of the tube at 75′. In each instance it will be noted that guidance in registration is obtained by orienting longitude lines of Figure 1 with longitude lines of Figure 3 and longitude lines of Figure 2. Where these pieces are properly proportioned and laid out the parts of the map fit together accurately. In Figures 1, 2 and 3 the parts are properly proportioned, but a portion of the Pacific ocean is omitted from Figure 3 to reduce its length.

To avoid distortion and to obtain upon inflation a reasonably accurate sphere I have found that the polar areas are preferably about ⅕ to about ¼ each of the total area of the surface when uninflated. The mid belt is about 2½ times the area of either of these pieces.

This proportionation of the sections to develop a good sphere when the entire piece is inflated is best understood by reference to Figure 4 wherein the device is shown inflated first to hold its shape. When assembled it is seen the basic form is a cylindrical object. In this figure the central straight sided portion of the cylinder is about 2½ times the area of the top or bottom section. This is approximately an optimum ratio and, though good results may be obtained by departure therefrom, in doing so, distortion to some degree of the ultimate sphere will result. That is, of course, the limiting case in one respect would be to prepare two polar projections on flat sections each carrying a map of the north and south hemispheres, and assemble them around the equator and upon inflation develop a globe. However, it will be found that such proportion introduces too much distortion. The best balance is obtained in about the proportions shown in the instant case.

It would be possible to prepare a polar projection of an area in the fashion shown in Figures 1 or 2 using as a central point any portion of the globe and develop therefrom a right cylindrical figure of the configuration shown in Figure 4 thereby to develop upon inflation of the entire assembly a spherical globe map of the world. Clearly, because the Mercator projection shown in Figure 3 is a conventional form and, further, because commonly polar projections are taken with reference to one or the other of the poles as the center, this is the preferred and most convenient way of carrying out the operation.

The map when finally assembled has the form of a right circular cylinder and, when inflated, the area around the equator, that is identified as the Mercator section, expands longitudinally and laterally more than the zeros of the figure and, thus, the distortion of the Mercator projection is corrected. The longitude lines of the Mercator section joining with the longitude lines of the polar sections, by virtue of this differential expansion, actually create gores or "orange peel" sections, which can be identified on conventional globes. That is, when manufacturing the conventional globe the degree of precision attained in presenting the information on the spherical surfaces is dependent upon the number of gores or "orange peel" sections which are printed on flat surfaces and assembled on a sphere. With this inflatable globe, made in accordance with this invention, the effect of a globe made with a large number of gores is attained simply by forming the object of the three simple sections, two polar sections and a Mercator section.

Polyvinyl chloride sheeting is a preferred material for use for as a plastic it has some elasticity and an elastic lag. A weight of sheeting should be used which will give a figure that may be inflated without greater effort than is needed for an ordinary balloon. Other sheeting materials may be used, provided they have at least about the degree of elasticity of the polyvinyl chloride. The technique of sealing the edges is a familiar one to fabricators of plastic sheeting.

Although the invention has been described in connection with only a single embodiment thereof, it will be understood that it can be practiced with variation and without departing from the spirit or scope of the invention.

What is claimed is:

1. An inflatable globe map of the world comprising a cylindrical figure having flat top, bottom and side sections, said sections being assembled in fixed relation to each other to form, prior to inflation, a right circular cylinder and a valve means thereon for permitting inflation of the said figure which when inflated forms a sphere.

2. An inflatable globe map of the world made in the form of a geometric figure in accordance with claim 1, the flat top and bottom sections thereof being polar projections oriented respectively around the north and south poles, the side section thereof being a Mercator projection.

3. An inflatable globe map of the world made in accordance with claim 2 wherein each polar section thereof comprises about ⅕ to ¼ of the total area of the figure.

4. The method of making an inflatable spherical map of the world comprising forming three sections, two of said sections being circular and the third rectangular, developing on each of said circular sections a polar projection of a limited area of the world, said polar projections being at opposite points of a diameter, developing on the remaining flat section a Mercator projection of the remainder of the area of the world, and assembling said parts in fixed relation in registry to form a cylindrical figure carrying the said projections, which figure upon inflation forms a sphere.

5. The method in accordance with claim 4 in which the polar projections are taken at the north and south poles respectively.

6. An inflatable globe map of a planet, comprising a cylindrical figure having a flat top, bottom and side sections, said sections being assembled in fixed relation to each other forming, prior to inflation, a right circular cylinder and valve means thereon for permitting inflation of said figure which when inflated forms a sphere.

7. An inflatable globe map comprising a cylindrical figure having a flat top, bottom and side sections, said sections being assembled in fixed relation to each other forming, prior to inflation, a right circular cylinder, and valve means thereon for permitting inflation of said figure which when inflated forms a sphere.

References Cited in the file of this patent

UNITED STATES PATENTS

| Number | Name | Date |
|---|---|---|
| 1,383,115 | Hendry | June 28, 1921 |
| 1,798,644 | Wheat et al. | Mar. 31, 1931 |
| 1,804,829 | Garrigue | May 12, 1931 |